United States Patent [19]

Toyoguchi

[11] Patent Number: 5,084,366
[45] Date of Patent: Jan. 28, 1992

[54] NON-AQUEOUS ELECTROLYTE SECONDARY CELL

[75] Inventor: Yoshinori Toyoguchi, Yao, Japan

[73] Assignee: Matsushita Electric Industrial Co., Ltd., Osaka, Japan

[21] Appl. No.: 501,851

[22] Filed: Mar. 30, 1990

Related U.S. Application Data

[63] Continuation of Ser. No. 498,212, Mar. 23, 1990, abandoned.

[30] Foreign Application Priority Data

| Mar. 30, 1989 | [JP] | Japan | 1-080327 |
| Apr. 11, 1989 | [JP] | Japan | 1-091335 |
| Nov. 2, 1989 | [JP] | Japan | 1-287004 |
| Nov. 30, 1989 | [JP] | Japan | 1-311161 |

[51] Int. Cl.$^5$ .................................................. H01M 10/40
[52] U.S. Cl. ..................................... 429/224; 429/194
[58] Field of Search .............................. 429/194, 224

[56] References Cited

U.S. PATENT DOCUMENTS

| 4,507,371 | 3/1985 | Thackeray et al. | 429/224 |
| 4,904,552 | 2/1990 | Furukawa et al. | 429/224 |
| 4,956,248 | 9/1990 | Furukawa et al. | 429/194 |

FOREIGN PATENT DOCUMENTS 0279235 1/1988 European Pat. Off. .
2528238 6/1983 France .

OTHER PUBLICATIONS

Ohzuku, et al., "Electrochemical Behavior of Spinel-Related Manganese Dioxide in Lithium Nonaqueous Cell".

"Lithium Insertion into Manganese Spinels", Mat. Res. Bull., vol. 18, pp. 461-472, 1983; Thackeray et al.
Patent Abstracts of Japan, vol. 14, No. 380 (E-965) [4323], Aug. 16th; & JP-A-2 139 861 (Matsushita Electric Ind. Co., Ltd.) 29-05-1990.
Patent Abstracts of Japan, vol. 14, No. 229 (E-928) [4172] May 15th 1990; & JP-A-2 60 056 (Sanyo Electric Co., Ltd.) 28-02-1990.
Chemical Abstracts, vol. 113, No. 12, Sep. 17th 1990, p. 219, Abstract No. 1000927c, Columbus, Ohio, U.S.; and JP-A-02 65 061 (Sanyo Electric Co., Lts) 05-03-1990.
Patent Abstacts of Japan, vol. II, No. 83 (E-489) [2530], Mar. 13, 1987; & JP-A-61 239 563 (Matsushita Electric Ind,. Co., Ltd.) 24-10-1986.

Primary Examiner—Stephen J. Kalafut
Attorney, Agent, or Firm—Stevens, Davis, Miller & Mosher

[57] ABSTRACT

A non-aqueous electrolyte secondary cell comprises a negative electrode composed of at least one selected from the group consisting of lithium and lithium compounds, a non-aqueous electrolyte containing a lithium salt, and a positive electrode active material having a composition represented by the general formula, $Li_xM_yMn_{(2-y)}O_4$, wherein M is at least one selected from the group consisting of Co, Cr, Fe and the like, $0.85 \leq x < 1.15$, and $0.02 \leq y \leq 0.3$. The positive electrode active material in a charged state has a composition represented by the general formula, $Li_xM_yMn_{2(-y)}O_4$, wherein $x \leq 0.7$, owing to the extraction of lithium ions from the positive electrode active material on charging. The non-aqueous electrolyte secondary cell has an improved cycle life.

3 Claims, 20 Drawing Sheets y IN LiFe$_y$Mn$_{(2-y)}$O$_4$ y IN $Li_{0.9}Fe_yMn_{(2-y)}O_4$

NON-AQUEOUS ELECTROLYTE SECONDARY CELL

REFERENCE TO RELATED APPLICATIONS

This application is a continuation-in-part of application Ser. No. 498,212, filed Mar. 23, 1990, now abandoned, the entire disclosure of which is herein incorporated by reference.

BACKGROUND OF THE INVENTION

1. Field of the Invention

The present invention relates to a improvement of a non-aqueous electrolyte secondary cell, and more particularly, to an improvement of positive electrode active material for the purpose of enhancing the cycle life of the cell.

2. Description of Related Art

Non-aqueous electrolyte secondary cells having a negative electrode of lithium or a lithium compound have been expected to have a high voltage and a high energy density, and many researches have been made.

Particularly, an intensive research have been made about $MnO_2$ and $TiS_2$ as positive electrode active materials. Recently, Tackeray et al have reported that $LiMn_2O_4$ could be used as positive electrode active material, [Mat. Res. Bull., Vol. 18, pp. 461–472, (1983)].

$LiMn_2O_4$ has a cubic system crystal structure of the spinel type, and can be used as positive electrode active material in a cell resulting in generation of a high discharge voltage thereof in the order of 4 volts. Thus, it has been expected to be a prospective positive electrode active material.

However, this positive electrode active material produces a problem about cycling characteristics associated with charge-discharge cyclic operation. That is, repetition of charging and discharging results in a considerable reduction of discharge capacity.

The $LiMn_2O_4$ positive electrode active material gives rise to a two step-type discharge curve where two flat regions appear at about 4 and 2.8 volts during discharge to 2 volts after charging to 4.5 volts as shown in FIG. 2, wherein the abscissa represents a composition of positive electrode active material used. The charge and discharge are effected with insertion of Li ions into the positive electrode active material and extraction of Li ions therefrom as reported by Ohzuku et al, (Proceedings of the 29th Electric Cell Symposium). The positive electrode active material having a composition of $Li_xMn_2O_4$ causes charging and discharging with a variation of x.

In view of the second flat step region at about 2.8 volts, a good stability of cycling characteristics has been achieved by limiting a charging voltage up to 3.8 volts with discharging voltage being limited down to 2 volts, that is, by the charge and discharge cycles with a variation of x from about 1 to 1.85.

However, such technique cannot achieve a high energy density. In order to achieve a high energy density, the first step cycle wherein charging up to 4.5 volts and discharging down to 3 volts may be allowed, that is, the charge until x reaches 1 or less, preferably 0.7 and the discharge until x reaches 1 or 1.85, may be advantageously employed. However, the cycle where charging is performed until x reaches less than 0.7 exhibits an inferior cycle life in that the discharging capacity is reduced to a half while effecting a number of cycles in the order of only about 50. When charging is performed to an extent as x being over 0.7, an insufficient charge is caused making it difficult to obtain a sufficient discharging capacity.

SUMMARY OF THE INVENTION

An object of the present invention is to improve a positive electrode active material for the purpose of enhancing the cycle life of the non-aqueous electrolyte secondary cell with $LiMn_2O_4$ as positive electrode active material.

Another object of the present invention is to provide a non-aqueous electrolyte secondary cell having a negative electrode of lithium or a lithium compound, a positive electrode, and a non-aqueous electrolyte containing a lithium salt, characterized in that said positive electrode comprises a positive electrode active material represented by the general formula:

$$Li_xM_yMn_{(2-y)}O_4$$

wherein M is at least one selected from the group consisting of Co, Cr, Fe and the like, $0.85 \leq x \leq 1.15$, and $0.02 \leq y \leq 0.3$, and that said positive electrode active material releases lithium ions with charging, whereby said positive electrode active material in a charged state has a composition represented by the general formula:

$$Li_xM_yMn_{(2-y)}O_4$$

wherein $x \leq 0.7$.

DETAILED DESCRIPTION OF PREFERRED EMBODIMENTS $LiMn_2O_4$ has a cubic system crystal structure of the spinel type, from which Li ions may be extracted by charging, and into which they may be inserted by discharging. X-ray diffraction analysis has shown that the $LiMn_2O_4$ after repeating the charging and discharging cycle has a reduced crystallinity.

Moreover, the examination on the characteristics of the active material, $Li_xMn_2O_4$, synthesized chemically with varying x has shown that discharge capacity and cycling characteristics are changed with the value of x. This indicates that the stability of the crystal structure of the active material itself has an influence on the cycle life.

Further examination has shown that the active materials of $Li_xMn_2O_4$ with a part of Mn atoms being replaced by Co, Cr or Fe atoms have smaller lattice constants than those of $Li_xMn_2O_4$. From the study on the characteristics of these materials as positive electrode active materials for secondary cells, they have been found to become positive electrode active materials for secondary cells having good cycle life which afford a high discharge capacity even after a number of cycles.

The enhancement of cycle life as described above may be attributed to an increase of the stability of the crystal structure which is caused by a reduction of the lattice constants of the spinel structure with a part of Mn atoms in the $Li_xMn_2O_4$ being replaced by Co, Fe or Cr atoms.

The present invention will be illustrated with reference to the following Examples.

EXAMPLE 1

As an active material of $LiMn_2O_4$ with Mn atoms being replaced by Co atoms, a solid solution of $LiMn_2O_4$ and $LiCoO_2$ was studied.

Preparation of $LiMn_2O_4$

A blend of $Li_2CO_3$ and $Mn_3O_4$ in a mol ratio of 3 to 4 was intimately mixed, and then the resulting mixture was heated in air at a temperature of 900° C. for 10 hours to produce $LiMn_2O_4$.

Preparation of $LiCoO_2$

A blend of $Li_2CO_3$ and $CoCO_3$ in a mol ratio of 1 to 2 was intimately mixed, and then the resulting mixture was heated in air at a temperature of 900° C. for 10 hours to produce $LiCoO_2$.

Preparation of a solid solution of $LiMn_2O_4$ with $LiCoO_2$

A blend of $LiCoO_2$ and $LiMn_2O_4$ in a mol ratio of 10 to 45 was intimately mixed, and then the resulting mixture was heated in air at a temperature of 900° C. for 10 hours.

Figure 3:
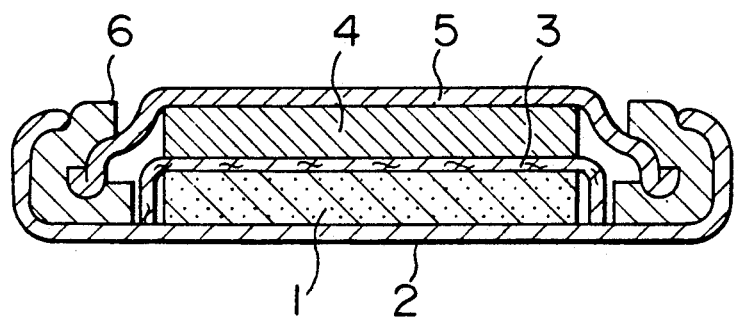
FIG. 3 is a cross-sectional view of the cells used in test.

Preparation of cells 7 parts by weight of the solid solution of $LiMn_2O_4$ with $LiCoO_2$ being dissolved therein as positive electrode active material, 2 parts by weight of acethylene black as conductive material, and 1 part by weight of polytetrafluoroethylene were mixed to produce a mixture for positive electrode. 0.1 gr. of the mixture for positive electrode was pressed under a pressure of 1 ton/cm² to a diameter of 17.5 mm to obtained a positive electrode. The cross-sectional view of the manufactured cell is shown in FIG. 3. The formed positive electrode is placed on case 2. A porous polypropylene film separator 3 is placed on positive electrode 1. As negative electrode, lithium plate 4 of 17.5 mm in diameter×0.3 mm in thickness was attached under pressure onto seal plate 5 which was sealed with polypropylene gasket 6. A non-aqueous electrolyte was prepared from a mixed solution of propylenecarbonate and dimethoxyethane in a volume ratio of 1 to 1 in which lithium perchlorate was dissolved in an amount of 1 mol/l, and added onto the separator and the negative electrode. Then, the cell was sealed. This cell will be referred to as cell A.

Similarly, a conventional cell using $LiMn_2O_4$ as positive electrode active material is designated as cell B. An additional conventional cell using $LiCoO_2$ as positive electrode active material is designated as cell C. These cells were charged up to 4.5 volts at a constant electric current of 2 mA, and discharged to 3 volts, which cycle was repeated.

Figure 2:
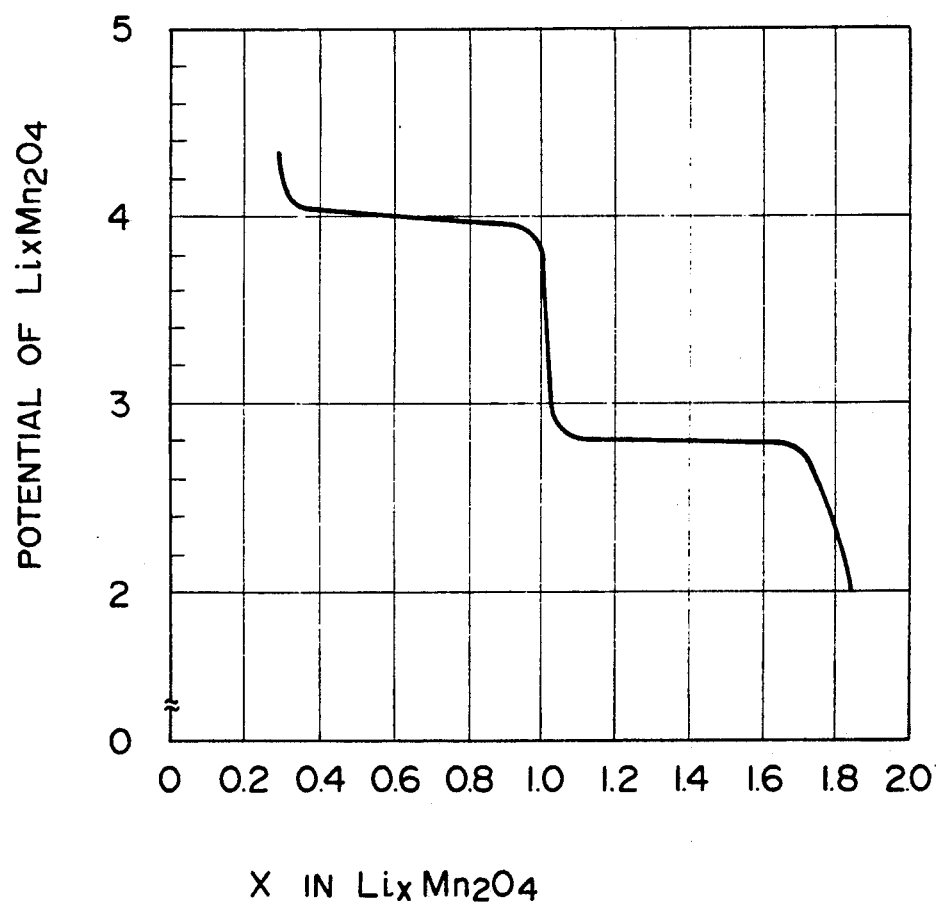
FIG. 2 shows a common discharge curve of a cell with $LiMn_2O_4$ when charging up to 4.5 volts and discharging to 2 volts.

Under such conditions, at the first cycle, the cells were charged until a proportion of x in the positive electrode active material reached below 0.7, i.e., 0.3, and discharged until the x reached 1, as can be seen from FIG. 2.

Figure 1:
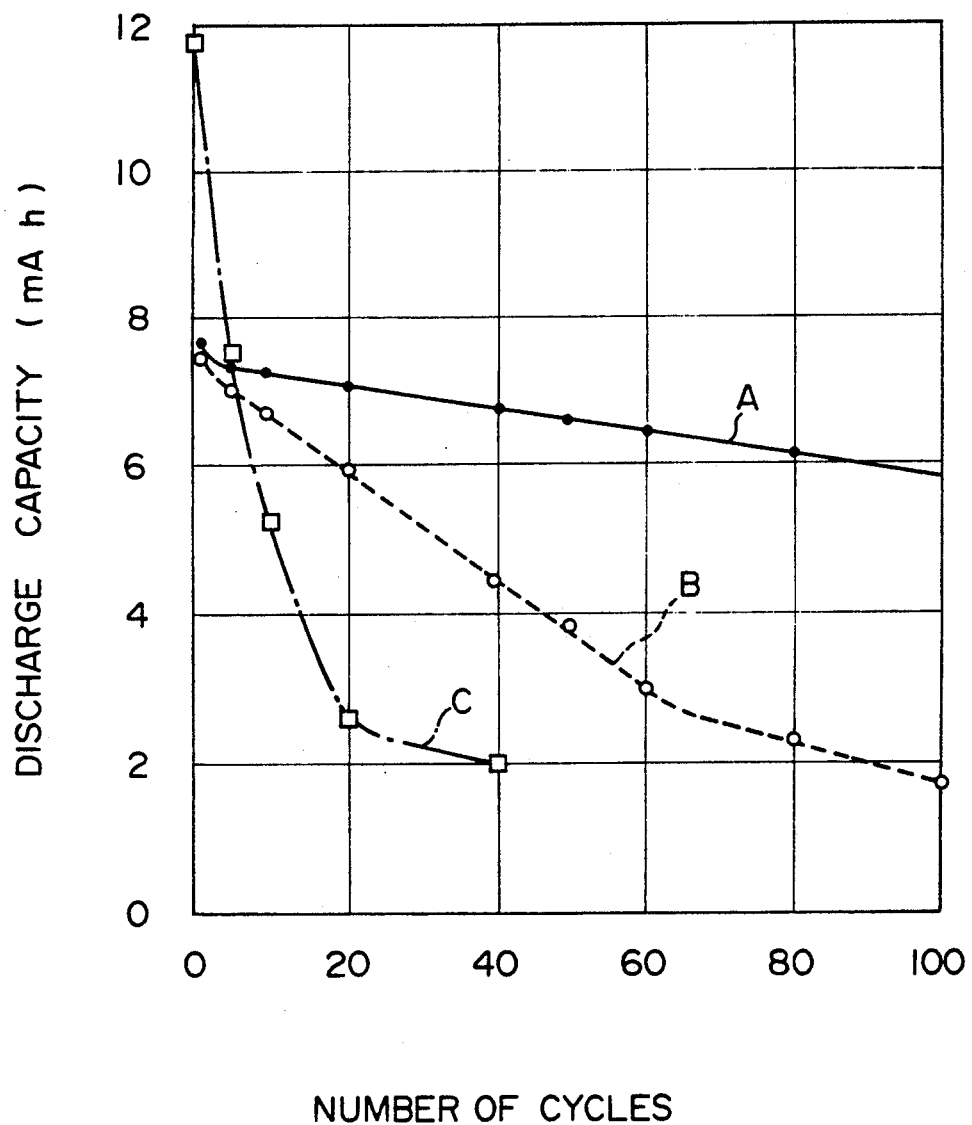
FIG. 1 is a graph showing some dependencies of the discharge capacity upon the number of cycles as cycling characteristics of cells.
Figure 4:
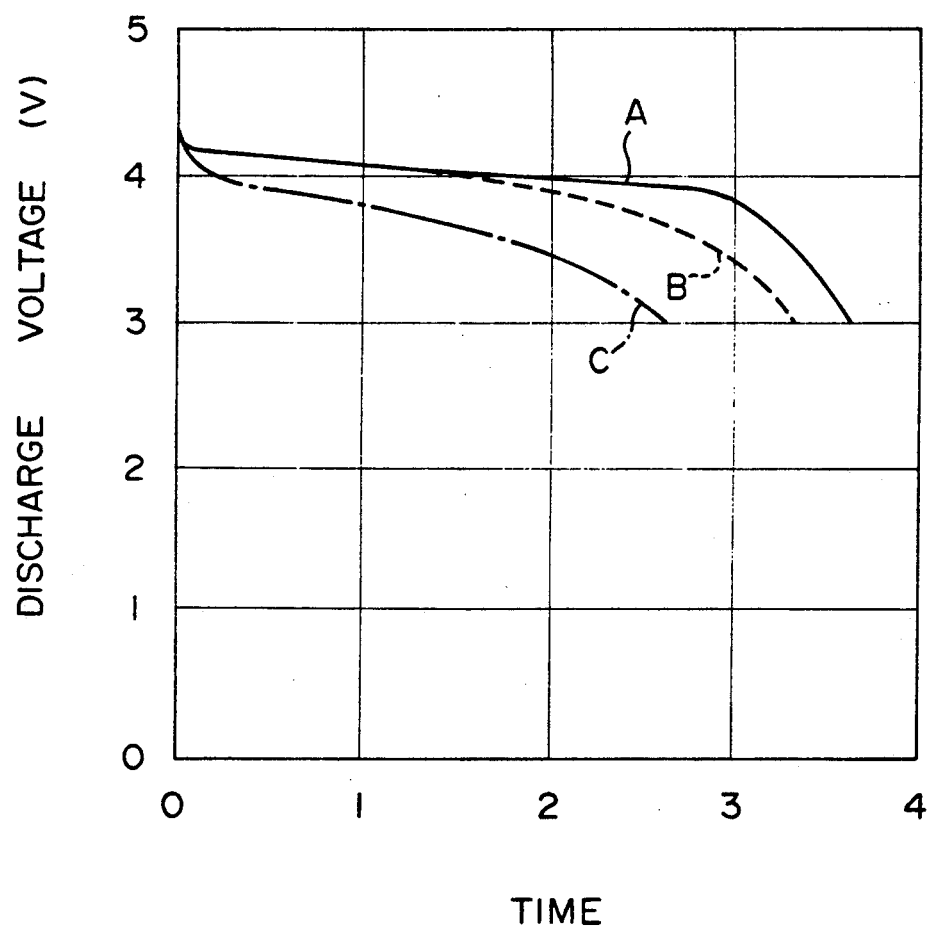
FIG. 4 is a graph showing some discharge curves of the cells.

FIG. 1 is a plot of the discharge capacity as function of the number of cycles. It can be appreciated from the Figure that the positive electrode of the solid solution of $LiMn_2O_4$ with $LiCoO_2$ being dissolved therein in accordance with the present invention exhibited less deterioration. FIG. 4 shows discharge curves of typical discharging characteristics of each of the three cells at the tenth cycle where deterioration was still insignificant. It can be appreciated from this Figure that the solid solution of $LiMn_2O_4$ with $LiCoO_2$ being dissolved therein in accordance with the present invention allowed to discharge at the same voltage as that by $LiMn_2O_4$ and is different from $LiCoO_2$.

X-ray diffraction analysis has shown that the solid solution of $LiMn_2O_4$ with $LiCoO_2$ being dissolved therein in accordance with the present invention has almost the same diffraction pattern as that of $LiMn_2O_4$. However, the locations of peaks in the pattern of the solid solution are shifted to a higher angle as compared with those of $LiMn_2O_4$, and the lattice constant is 8.21 Å while that of $LiMn_2O_4$ is 8.24. Taking into consideration the results, the effect would be assumed that the contract of the lattice constant stabilizes the crystal causing enhancement of the cycle life.

Generally, spinel has a composition of $AB_2O_4$ as $LiMn_2O_4$, wherein A is a metal element located at the center of a surrounding tetrahedron of oxygen atoms, and B is a metal element at the center of a surrounding octahedron of oxygen atoms. However, $LiCoO_2$ does not have this composition. Therefore, the solid solution as described in this Example is assumed to have the following composition:

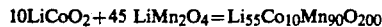

$$10LiCoO_2 + 45\ LiMn_2O_4 = Li_{55}Co_{10}Mn_{90}O_{200}$$

that is, $Li_{1.1}Co_{0.2}Mn_{1.8}O_4$ wherein Co and Mn atoms corresponding to the total of 2.0 are in the surrounding octahedron of oxygen atoms, and Li atoms corresponding to 1.0 are in the ordinary locations as in the normal spinel, and the remainder of Li atoms corresponding to 0.1 are in the vacant surrounding tetrahedron of oxygen atoms in the spinel. Thus, the solid solution of $LiMn_2O_4$ with $LiCoO_2$ being dissolved therein in accordance with the present invention is of a different composition from that of the normal spinel.

EXAMPLE 2

In this Example, various solid solutions of $LiMn_2O_4$ with $LiCoO_2$ being dissolved therein where the ratio of $LiCoO_2$ to $LiMn_2O_4$ was varied were prepared, and the characteristics of the positive electrode active materials were studied.

The solid solutions were made by heating and used to manufacture cells, as described in Example 1, whose characteristics were examined.

Figure 5:
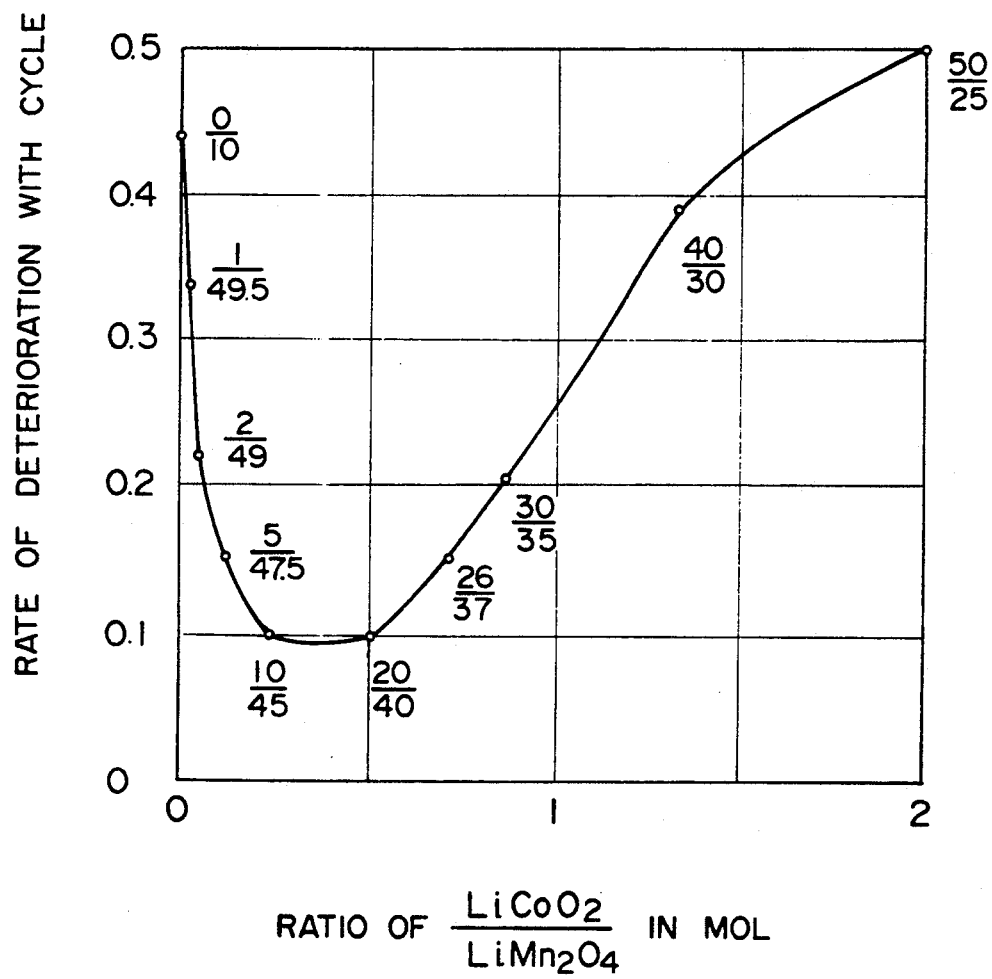
FIG. 5 is a plot of the rate of deterioration as a function of the mol ratio of $LiCoO_2$ to $LiMn_2O_4$ as cycling characteristics.

The cycling characteristics of the positive electrode active materials were represented by an index which is a product obtained by subtracting the discharge capacity at the 50th cycle from that at the tenth cycle, and dividing the difference by the latter discharge capacity. That is, the index means a rate of deterioration with cycles, the value of which should be lower for higher performance. FIG. 5 is a plot of the cycling characteristics versus the mol ratio of $LiCoO_2$ to $LiMn_2O_4$. As an amount of $LiCoO_2$ was increased, the cycling characteristics were enhanced. However, an extent of the enhancement was reduced with the ratio of $LiCoO_2$ to $LiMn_2O_4$ being increased from 10 to 45. Moreover, as an amount of $LiCoO_2$ was increased to a ratio of 1 to 1, the cycling characteristics were rather lowered.

As can be seen from the above, the ratio of $LiCoO_2/LiMn_2O_4$ should preferably be from 2/99 to 30/85, more preferably from 5/97.5 to 26/87. That is, the composition of the solid solution should preferably be $Li_{1.01}Co_{0.02}Mn_{1.98}O_4$ to $Li_{1.15}Co_{0.3}Mn_{1.7}O_4$, more preferably $Li_{1.025}Co_{0.05}Mn_{1.95}O_4$ to $Li_{1.13}Co_{0.26}Mn_{1.74}O_4$.

X-ray diffraction analysis has shown that in the active materials used in this Example, the solid solutions having a ratio of $LiCoO_2$ to $LiMn_2O_4$ up to 30 to 85 exhibited the same pattern as that of $LiMn_2O_4$, and that the larger the proportion of the dissolved $LiCoO_2$, the smaller the lattice constant of the cubic crystal. Above that ratio, other peaks appear in the diffraction pattern implying existence of other crystal system than cubic.

EXAMPLE 3

In Examples 1 and 2, $LiCoO_2$ and $LiMn_2O_4$ were reacted to produce the solid solutions of $LiMn_2O_4$ with $LiCoO_2$ being dissolved therein. Such method was time-consuming because of low reactivity of $LiCoO_2$ and $LiMn_2O_4$. In this Example, predetermined amounts of $Li_2CO_3$, $Mn_3O_4$ and $CoCO_2$ were intimately mixed and then reacted by heating at a temperature of 900° C. for 10 hours, rather than the production of $LiCoO_2$ and $LiMn_2O_4$ separately.

In order to produce solid solutions having the same composition as described in Example 1, 27.5 mols of $Li_2CO_3$, 30 mols of $Mn_3O_4$ and 10 mols of $CoCO_2$ were mixed and then heated at a temperature of 900° C. for 10 hours. The X-ray diffraction analysis of the products and the similar cell tests produced the identical results.

EXAMPLE 4

In Examples 1 and 2, it has been found that the cycling characteristics of the cells could be enhanced by dissolving $LiCoO_2$ into $LiMn_2O_4$ having a structure of the spinel type with maintaining the crystal structure of $LiMn_2O_4$. In such case, it was believed that Co atoms entered substituting for Mn atoms, and a ratio of Li atoms to oxygen atoms were increased to 1 to 4 or more.

In Example 3, it was found that $Li_xCo_yMn_{(2-y)}O_4$ could be produced by mixing predetermined amounts of a Li compound, Co compound and Mn compound, and heating the mixture.

In this Example, solid solutions of $Li_xCo_yMn_{(2-y)}O_4$ with y being varied while keeping the value of x constant, and with x being varied while keeping the value of y constant were prepared, and these positive electrode active materials were examined for their cycling characteristics.

Predetermined amounts of $Li_2CO_3$, $CoCO_3$ and $Mn_3O_4$ were weighed so as to achieve y=0, 0.01, 0.02, 0.05, 0.1, 0.2, 0.3 and 0.4 corresponding to x=1.0, 1.01, 1.025, 1.05, 1.10, 1.15 and 1.20. Solid solutions were produced as in Example 3. Cells were manufactured and tested for the cycling characteristics as in Example 1.

The rate of deterioration was determined for the cycling characteristics as in Example 2, and the obtained deterioration rates of the active materials are shown in Table 1 with the corresponding values of x and y. It has been found from the results that the proportions of Li, x and of Co, y are both effective for enhancement of the cycle life of the positive electrode active materials. It has been also found, however, that too large amounts of either of Li or Co are ineffective.

TABLE 1

| | | Proportion of Li, x | | | | | | |
|---|---|---|---|---|---|---|---|---|
| | | 1.0 | 1.01 | 1.025 | 1.05 | 1.10 | 1.15 | 1.20 |
| Proportion of Co, y | 0 | 0.44 | 0.43 | 0.40 | 0.36 | 0.33· | 0.38 | 0.41 |
| | 0.01 | 0.34 | 0.33 | 0.32 | 0.32 | 0.31 | 0.32 | 0.39 |
| | 0.02 | 0.29 | 0.22 | 0.21 | 0.20 | 0.18 | 0.19 | 0.38 |
| | 0.05 | 0.27 | 0.20 | 0.15 | 0.13 | 0.14 | 0.18 | 0.36 |
| | 0.10 | 0.25 | 0.19 | 0.14 | 0.10 | 0.10 | 0.18 | 0.34 |
| | 0.20 | 0.25 | 0.19 | 0.14 | 0.12 | 0.10 | 0.18 | 0.33 |
| | 0.30 | 0.26 | 0.22 | 0.21 | 0.19 | 0.16 | 0.21 | 0.33 |

TABLE 1-continued

| | Proportion of Li, x | | | | | | |
|---|---|---|---|---|---|---|---|
| | 1.0 | 1.01 | 1.025 | 1.05 | 1.10 | 1.15 | 1.20 |
| 0.40 | 0.36 | 0.35 | 0.35 | 0.34 | 0.31 | 0.37 | 0.39 |

Examples 1 to 4 indicate that non-aqueous electrolyte secondary cells having a good cycle life, i.e., a large discharge capacity even after a certain cyclic operation could be obtained using the $Li_xCo_yMn_{(2-y)}O_4$ with a proportion of Co, y being 0.02 or more but 0.3 or less, and with a proportion of Li, x being 1 or more but 1.15 or less.

EXAMPLE 5

A case of $Li_xCo_yMn_{(2-y)}O_4$ with x being 1 or less was studied.

Preparation of $LiMn_2O_4$

The preparation was conducted as in Example 1.

Preparation of $Li_xMn_2O_4$ $Li_2CO_3$ and $Mn_3O_4$ were intimately mixed in such amounts as achieving predetermined x of Li atoms and 2 mols of Mn atoms, and then the mixture was heated in air at a temperature of 900° C. for 10 hours to produce $Li_xMn_2O_4$, wherein x=0.95, 0.90, 0.85 or 0.80 as positive electrode active materials.

Preparation of $Li_xCo_yMn_{(2-y)}O_4$ $Li_2CO_3$, $Mn_3O_4$ and $CoCO_3$ were intimately mixed in such proportions as achieving the predetermined x of Li atoms, y mols of Co atoms and 2-y mols of Mn atoms, and then the mixture was heated in air at a temperature of 900° C. for 10 hours to produce $Li_xCo_yMn_{(2-y)}O_4$ wherein x=0.95, 0.90, 0.85 or 0.80, and y=0.01, 0.02, 0.05, 0.1, 0.2, 0.3 or 0.4 for each x as positive electrode active materials.

Manufacture of cells and charging-discharging test

The procedures of Example 1 were repeated.

Under the indicated conditions, at the first cycle, the cells were charged until a proportion of x in the positive electrode active material reached below 0.7, i.e., 0.3, and discharged until the x reached 1, as can be seen from FIG. 2.

Figure 6:
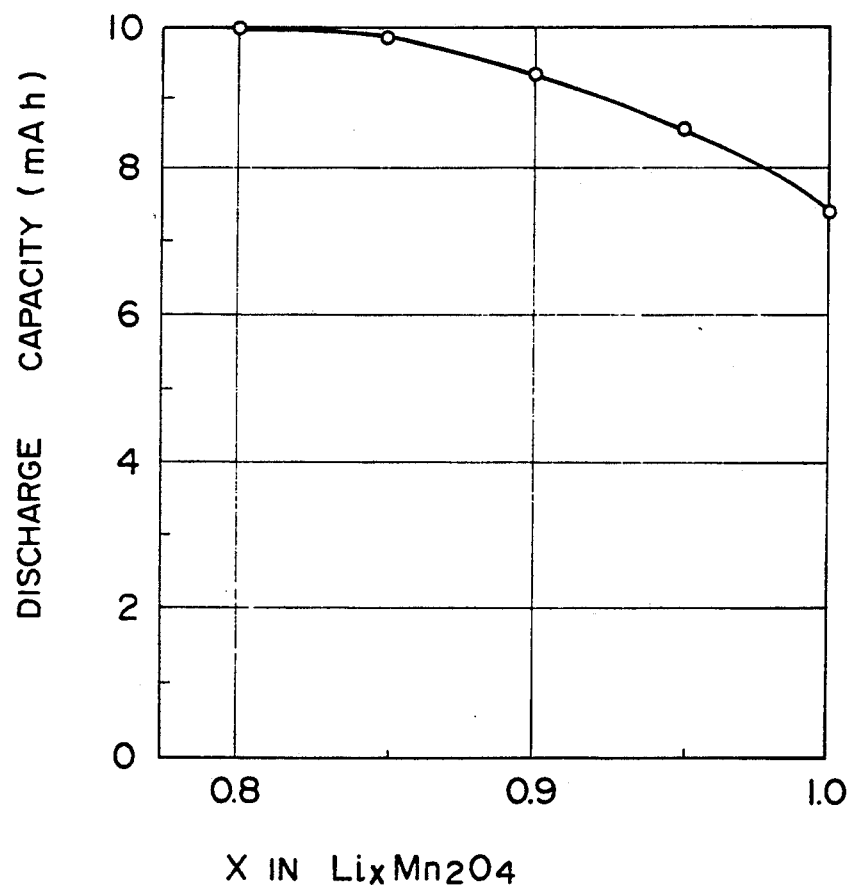
FIG. 6 is a plot of the discharge capacity as a function of x from $Li_xMn_2O_4$ at the first cycle.

FIG. 6 is a plot of the discharging capacity versus the x from $Li_xMn_2O_4$. It can be seen from this Figure that the smaller the value of x, the higher the discharge capacity.

Figure 7:
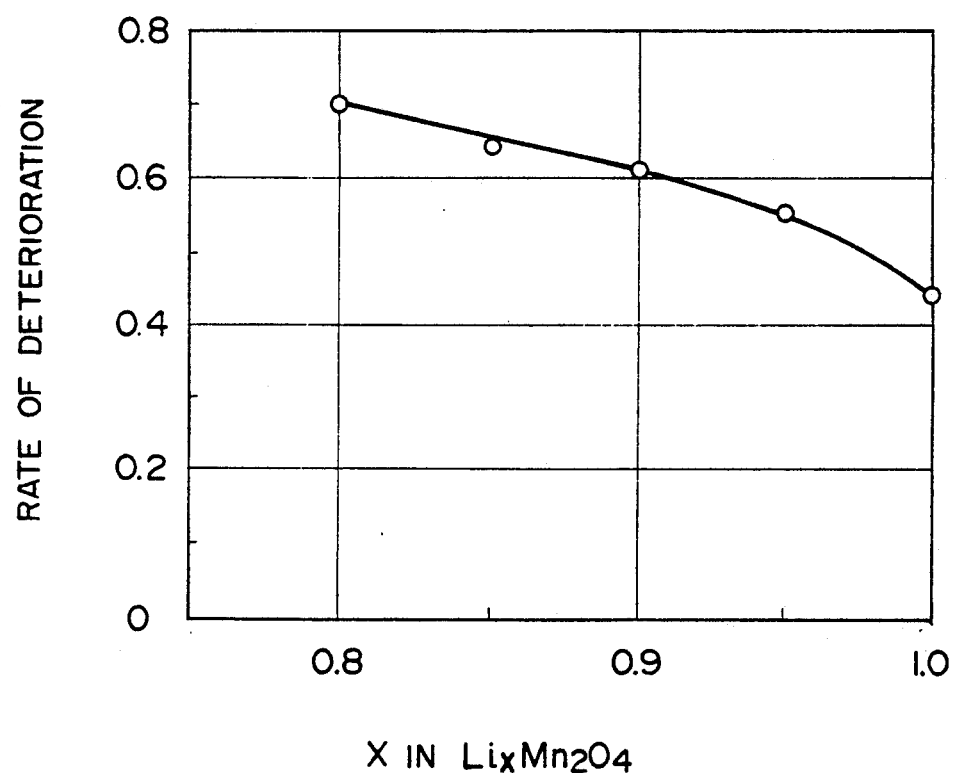
FIG. 7 is a plot of the rate of deterioration with cycle as a function of x of $Li_xMn_2O_4$.

The cycling characteristics of the positive electrode active materials were represented by an index which is a product obtained by subtracting the discharge capacity at the 50th cycle from that at the tenth cycle, and dividing the difference by the latter discharge capacity. That is, the index means a rate of deterioration with cycles, the value of which should be lower for higher performance. FIG. 7 is a plot of the deterioration rate for the cycles versus the x from $Li_xMn_2O_4$. As the value of x was decreased, the deterioration rate was increased.

Then, using the $Li_xCo_yMn_{(2-y)}O_4$ with a part of Mn atoms being replaced by Co atoms, cells were manufactured and tested for charging and discharging properties.

Table 2 shows the discharge capacity in terms of mAH at the 50th cycle as a function of x and y from the $Li_xCo_yMn_{(2-y)}O_4$. Table 3 shows the rate of deterioration with cycle of each active material.

TABLE 2

| | | Proportion of Li, x | | | | |
|---|---|---|---|---|---|---|
| | | 1.0 | 0.95 | 0.90 | 0.85 | 0.80 |
| Proportion of Co, y | 0 | 3.8 | 3.4 | 3.1 | 3.0 | 2.6 |
| | 0.01 | 4.5 | 4.6 | 4.6 | 4.6 | 3.6 |
| | 0.02 | 4.9 | 5.6 | 6.1 | 5.4 | 4.4 |
| | 0.05 | 5.1 | 5.8 | 6.2 | 5.5 | 4.5 |
| | 0.1 | 5.2 | 6.0 | 6.5 | 5.7 | 4.6 |
| | 0.2 | 5.2 | 6.0 | 6.2 | 5.7 | 4.6 |
| | 0.3 | 5.1 | 5.9 | 6.1 | 5.5 | 4.6 |
| | 0.4 | 4.3 | 4.6 | 4.5 | 4.1 | 3.2 |

TABLE 3

| | | Proportion of Li, x | | | | |
|---|---|---|---|---|---|---|
| | | 1.0 | 0.95 | 0.90 | 0.85 | 0.80 |
| Proportion of Co, y | 0 | 0.44 | 0.55 | 0.61 | 0.64 | 0.70 |
| | 0.01 | 0.34 | 0.43 | 0.44 | 0.47 | 0.59 |
| | 0.02 | 0.29 | 0.29 | 0.29 | 0.39 | 0.50 |
| | 0.05 | 0.27 | 0.27 | 0.28 | 0.38 | 0.49 |
| | 0.1 | 0.25 | 0.25 | 0.25 | 0.37 | 0.48 |
| | 0.2 | 0.25 | 0.25 | 0.28 | 0.37 | 0.48 |
| | 0.3 | 0.26 | 0.26 | 0.29 | 0.38 | 0.48 |
| | 0.4 | 0.36 | 0.40 | 0.46 | 0.53 | 0.63 |

Figure 8:
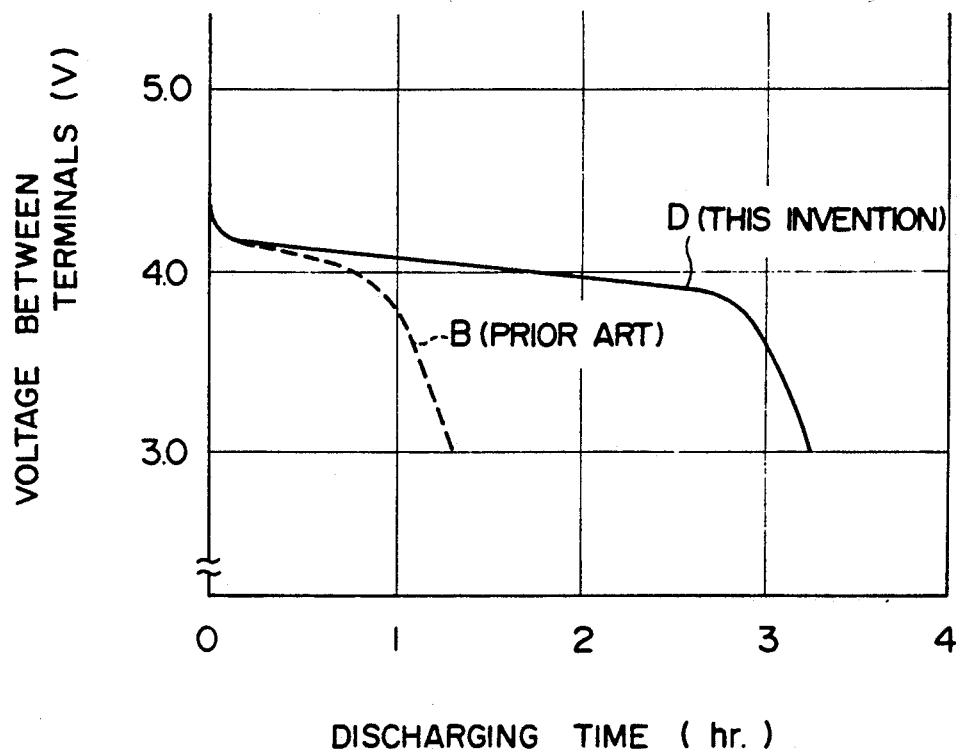
FIG. 8 shows a comparison of the discharge curve of an embodiment of cells in accordance with the present invention, cell D using $Li_{0.9}Co_{0.1}Mn_{1.9}O_4$, with that of conventional cell B using $LiMn_2O_4$ at the 50th cycle.

FIG. 8 shows discharge curves for an embodiment of the present invention, i.e., cell D using $Li_{0.9}Co_{0.1}Mn_{8}$.$_9O_4$ and conventional cell B using $LiMn_2O_4$ at the 50th cycle.

It can be appreciated that the cells of the present invention is superior.

In the above, the cycling characteristics can be enhanced when y from the $Li_xCo_yMn_{(2-y)}O_4$ is 0.02 or more but 0.3 or less, and in addition, the discharge capacity is higher when x is 0.85 or more but less than 1 as compared with Li $Mn_2O_4$.

X-ray diffraction analysis has shown that the $Li_xCo_yMn_{(2-y)}O_4$ in accordance with the present invention has almost the same diffraction pattern as that of $LiMn_2O_4$. However, the locations of peaks in the pattern are shifted to a higher angle as compared with those of $LiMn_2O_4$, and the lattice constant of the $Li_{0.9}Co_{0.1}Mn_{1.9}O_4$ obtained from the diffraction peaks is 8.21 Å, i.e., smaller than 8.24 Å of $LiMn_2O_4$. It is believed that the contract of the lattice constant stabilizes the crystal causing enhancement of the cycle life.

From Example 5, the non-aqueous electrolyte secondary cells can be increased in capacity as well as enhanced in cycle life by using as positive electrode active materials the solid solution represented by the formula, $Li_xCo_yMn_{(2-y)}O_4$, wherein $0.85 \leq x < 1$, $0.02 \leq y \leq 0.3$.

As a result of Examples 1 to 5, the non-aqueous electrolyte secondary cells can be increased in capacity as well as enhanced in cycle life by using as positive electrode active materials the solid solution represented by the formula, $Li_xCo_yMn_{(2-y)}O_4$, wherein $0.85 \leq x < 1.15$, $0.02 \leq y \leq 0.3$.

In the next place, the active materials of $LiMn_2O_4$ with a part of Mn atoms being replaced by Cr or Fe were examined. It has been found that they were positive electrode active materials capable of providing secondary cells having a good cycle life, i.e., a higher discharge capacity at the fifth cycle et seq. though the discharge capacity at the first cycle was a little reduced.

The results as described above is believed to be attributed to the fact that the reduction of the lattice constant of the spinel structure by substituting Fe or Cr atoms for a part of Mn atoms in $Li_xMn_2O_4$ causes an increase of the stability of the crystal to improve the cycling characteristics similarly to the case by substituting Co atoms. Moreover, it has been found that as the x from $Li_xMn_2O_4$ with a part of Mn atoms being replaced by Fe or Cr atoms is increased than 1, the cycle life are further enhanced.

EXAMPLE 6

Preparation of $LiM_yMn_{(2-y)}O_4$ (M=Cr, Fe)

$Li_2CO_3$, $Mn_3O_4$ and $Cr_2O_3$ or $Fe_2O_3$ were intimately mixed in such proportions as achieving 1 mol of Li atoms, y mols of Cr or Fe atoms and 2-y mols of Mn atoms, and then the mixture was heated in air at a temperature of 900° C. for 10 hours to produce $Li_xM_yMn_{(2-y)}O_4$, wherein for Cr or Fe, y=0.01, 0.02, 0.05, 0.1, 0.2, 0.3 and 0.4 as positive electrode active materials.

Manufacture of cells and charging-discharging test were performed as in Example 1.

Under the indicated conditions, at the first cycle, the cells were charged until a proportion of x in the positive electrode active material reached below 0.7, i.e., 0.3, and discharged until the x reached 1, as can be seen from FIG. 2.

Figure 9:
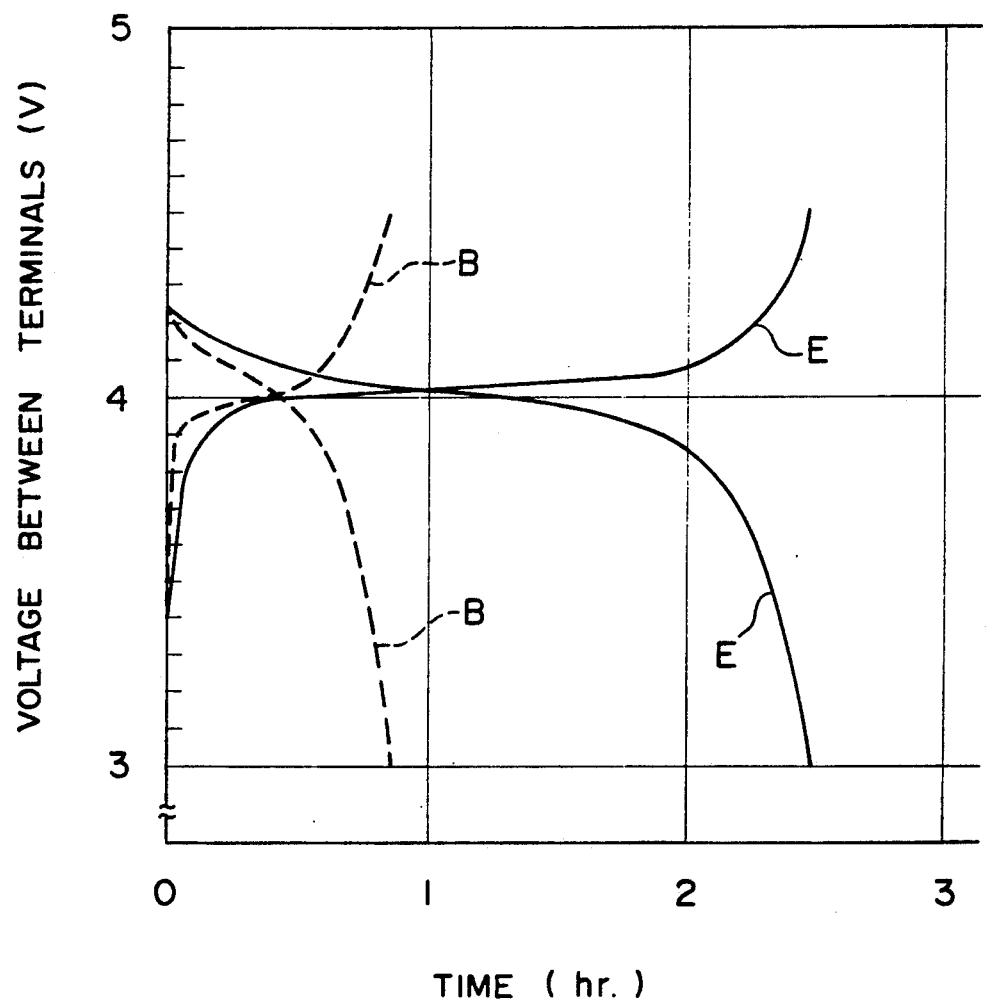
FIG. 9 shows a comparison of the discharge curve of an embodiment of cells in accordance with the present invention, cell E using $LiFe_{0.2}Mn_{1.8}O_4$, with that of conventional cell B using $LiMn_2O_4$ at the 100th cycle.

FIG. 9 shows charge-discharge curves for an embodiment of the present invention, i.e., cell E using $LiFe_{0.2}Mn_{1.8}O_4$ and conventional cell B using $LiMn_2O_4$ at the 100th cycle.

In view of the charge curves corresponding to the dischargings, a charging voltage of not less than 4 volts is required. Moreover, the cells of the present invention were higher in a quantity of electricity for either charging or discharging.

Figure 10:
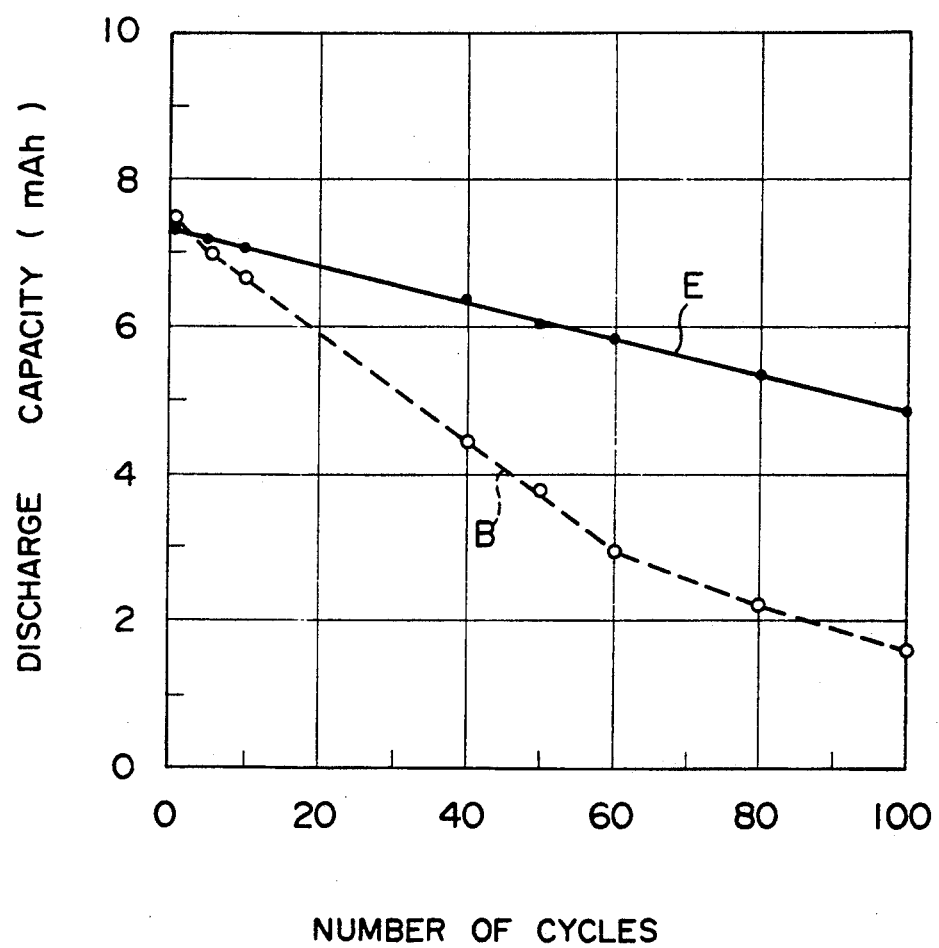
FIG. 10 shows plots of the discharge capacities of the cells at each cycle.

FIG. 10 is a plot of the discharge capacity at each cycle. It can be seen from this Figure that the use of the active materials of the present invention results in good cycle life. Chemical analysis has shown that at the end of charging at the 101th cycle, x was 0.84 for the conventional active materials, while 0.56 for those of the present invention. It has been found that the deterioration with cycles could be caused by distraction of the crystallinity of the active materials making charging impossible, that is, by a less tendency to extraction of Li ions from the active materials.

Figure 11:
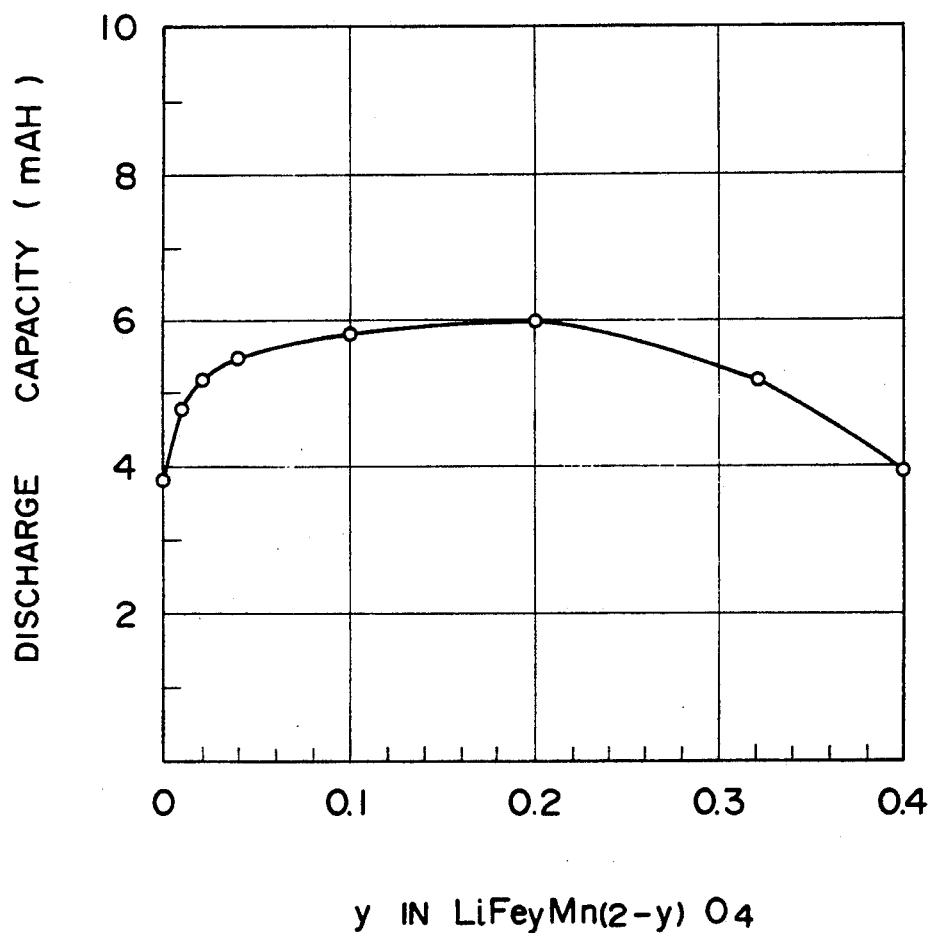
FIG. 11 shows the discharge capacity in terms of mAH as a function of y of $LiFe_yMn_{(2-y)}O_4$ at the 50th cycle.

FIG. 11 shows the discharge capacity in terms of mAH at the 50th cycle as a function of y from the $LiFe_yMn_{(2-y)}O_4$.

Figure 12:
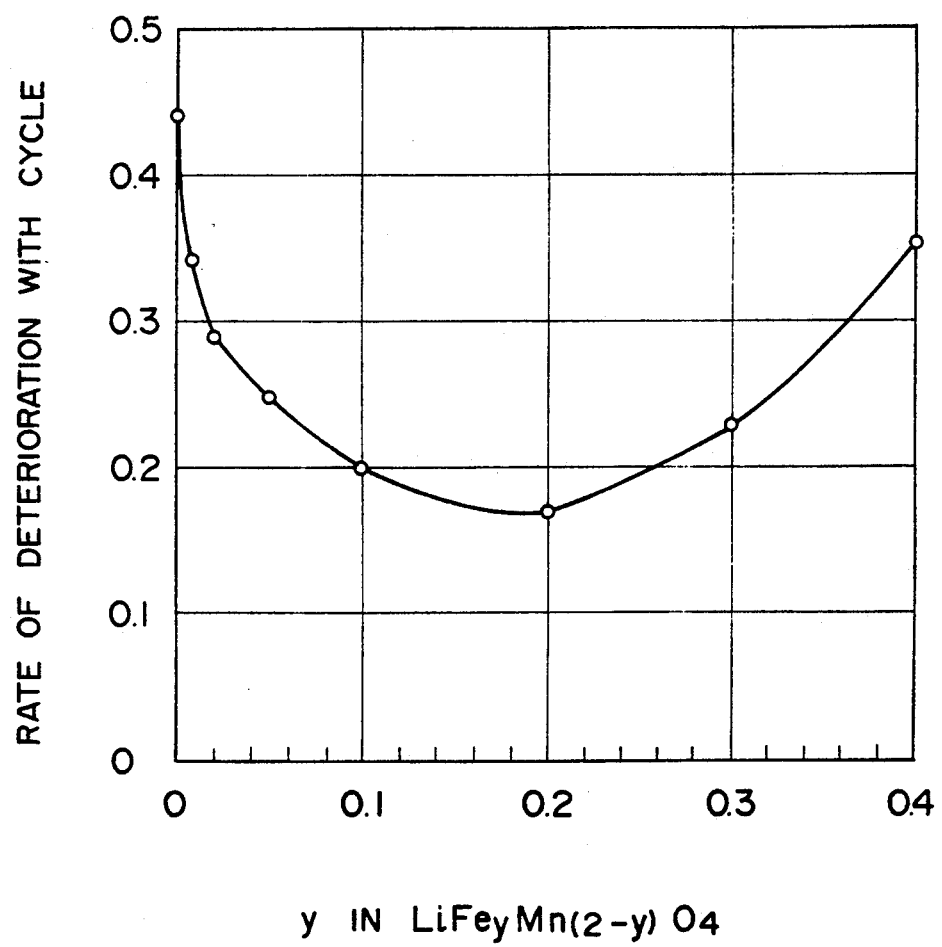
FIG. 12 shows the rate of deterioration with cycle of one of the active materials of the present invention, $LiFe_yMn_{(2-y)}O_4$, as a function of y.

FIG. 12 shows the rate of deterioration with cycles for each active material. Comparing with the conventional cell at y=0, it can be seen that the cells in accordance with the present invention is superior.

It can be recognized from the above that the rate of deterioration with cycles becomes smaller with y being 0.02 or more. When y is beyond 0.3, the rate of deterioration increases. This is believed due to the occurrence of strain in the crystal. This caused an reduction in discharge capacity as shown in FIG. 11. Therefore, the value of y should preferably be 0.02 or more but 0.3 or less.

Then, using $LiMn_2O_4$ with a part of Mn atoms being replaced by Cr atoms, cells were manufactured and tested for charging and discharging properties in the same way as described previously.

Figure 13:
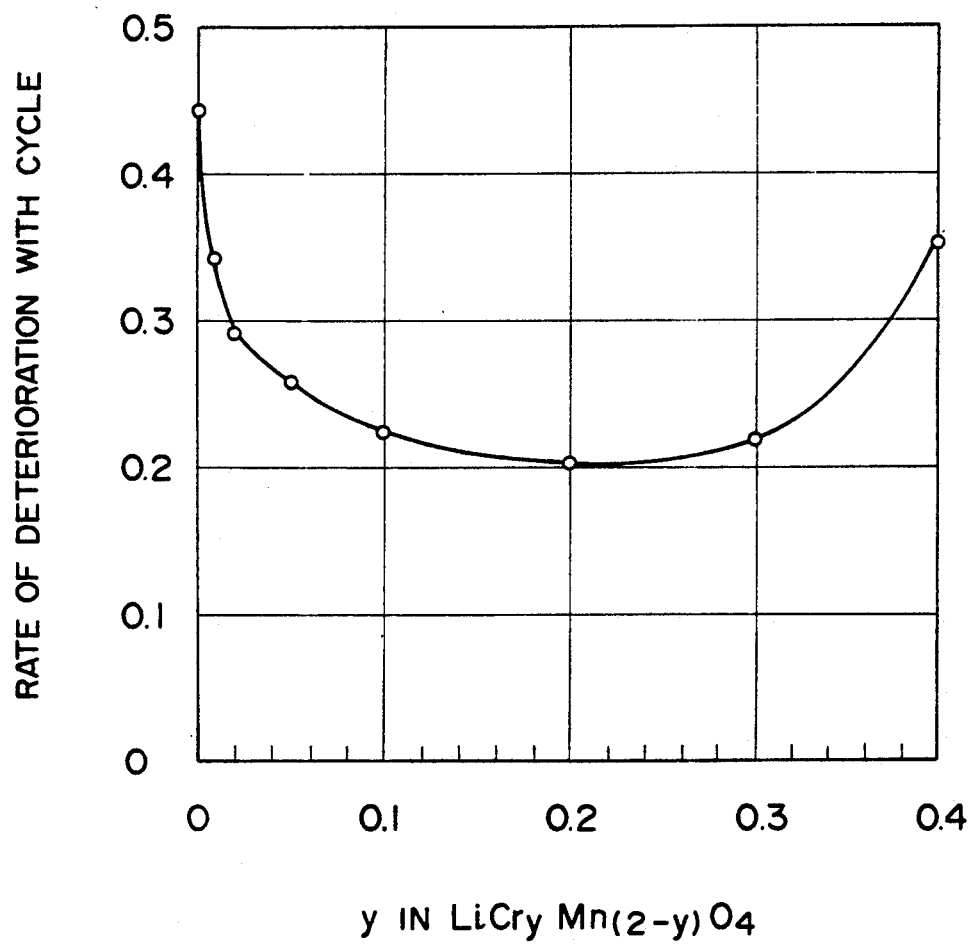
FIG. 13 shows the rate of deterioration with cycle of the cell using one of the active materials of the present invention, $LiCr_yMn_{(2-y)}O_4$ as a function of y.

FIG. 13 shows the rate of deterioration with cycle of cells using the active material, $LiCr_yMn_{(2-y)}O_4$ with y being varied.

When the $LiCr_yMn_{(2-y)}O_4$ was used as active material, again good results were obtained under the condition that y was 0.02 or more but 0.3 or less similarly to the case using the $LiFe_yMn_{(2-y)}O_4$.

EXAMPLE 7

Effects of the value of x from the $Li_xM_yMn_{(2-y)}O_4$ chemically synthesized on the cycling characteristics were studied.

Preparation of $Li_xM_yMn_{(2-y)}O_4$ (M=Cr, Fe)

$Li_2CO_3$, $Mn_3O_4$ and $Cr_2O_3$ or $Fe_2O_3$ were intimately mixed in such proportions as achieving x mol of Li atoms, y mols of Cr or Fe atoms and 2-y mols of Mn atoms, and then the mixture was heated in air at a temperature of 900° C. for 10 hours to produce the $Li_xM_yMn_{(2-y)}O_4$, wherein x=1.0, 1.01, 1.025, 1.05, 1.10, 1.15 and 1.20 corresponding to y=0, 0.01, 0.02, 0.05, 0.1, 0.2, 0.3, and 0.4 for Cr or Fe.

Manufacture of cells and charging-discharging test were performed in the same way as in Example 1.

The rate of deterioration were determined for the cycling characteristics as in Example 6, and shown in Table 4 for the active materials corresponding to the values of x and y in the case using Fe as M. It has been found from the results that the proportions of Li, x and of Fe, y are both effective for enhancement of the cycle life of the positive electrode active materials. It has also been found, however, that too large proportions of either of Li or Fe causes an reduction of the cycle life as shown in Example 1. When a proportion of Fe is 0.02 or more but 0.3 or less, that of Li should be 1 or more but 1.15 or less.

TABLE 4

|  |  | Proportion of Li, x | | | | | | |
| --- | --- | --- | --- | --- | --- | --- | --- | --- |
|  |  | 1.0 | 1.01 | 1.025 | 1.05 | 1.10 | 1.15 | 1.20 |
| Pro- | 0 | 0.44 | 0.43 | 0.40 | 0.36 | 0.33 | 0.38 | 0.41 |
| portion | 0.01 | 0.34 | 0.33 | 0.32 | 0.32 | 0.31 | 0.32 | 0.39 |
| of Fe, | 0.02 | 0.29 | 0.23 | 0.16 | 0.15 | 0.15 | 0.19 | 0.38 |
| y | 0.05 | 0.25 | 0.20 | 0.15 | 0.15 | 0.15 | 0.18 | 0.32 |
|  | 0.10 | 0.20 | 0.18 | 0.14 | 0.12 | 0.12 | 0.18 | 0.29 |
|  | 0.20 | 0.17 | 0.19 | 0.14 | 0.12 | 0.12 | 0.18 | 0.26 |
|  | 0.30 | 0.23 | 0.22 | 0.15 | 0.14 | 0.15 | 0.21 | 0.26 |
|  | 0.40 | 0.35 | 0.34 | 0.34 | 0.34 | 0.34 | 0.38 | 0.44 |

Similarly, when Cr was used as M, the same results as those using Fe were obtained. When a proportion of Cr was 0.02 or more but 0.3 or less, that of Li of 1 or more but 1.15 or less resulted in good performance.

Examples 6 and 7 as described above indicate that the non-aqueous electrolyte secondary cells having a negative electrode of lithium or a lithium compound, containing a lithium salt, and having a good cycle life can be obtained by using an active material represented by the general formula, $Li_xM_yMn_{(2-y)}O_4$, wherein M is at least one selected from the group consisting of Cr, Fe and the like, $1 \leq x \leq 1.15$, $0.02 \leq y \leq 0.3$, and by allowing the composition of the active material in a charged state to have the general formula, $Li_xM_yMn_{(2-y)}O_4$, wherein $x \leq 0.7$.

In addition, the case of $Li_xM_yMn_{(2-y)}O_4$ (M=Fe, Cr) wherein x is less than 1 was studied.

EXAMPLE 8

Preparation of $Li_xM_yMn_{(2-y)}O_4$ (M=Cr, Fe)

$Li_2CO_3$, $Mn_3O_4$ and $Cr_2O_3$ or $Fe_2O_3$ were intimately mixed in such proportions as achieving x mol of Li atoms, y mols of Cr or Fe atoms and 2-y mols of Mn atoms, and then the mixture was heated in air at a temperature of 900° C. for 10 hours to produce $Li_xM_yMn_{(2-y)}O_4$, wherein x=0.95, 0.90, 0.85 and 0.80 corresponding to y=0, 0.01, 0.02, 0.05, 0.1, 0.2, 0.3 and 0.4 for Cr or Fe, as positive electrode active materials.

Manufacture of cells and charging-discharging test were performed as in Example 1.

Under the indicated conditions, at the first cycle, the cells were charged until a proportion of x in the positive electrode active material reached below 0.7, i.e., 0.3, and discharged until the x reached 1, as can be seen from FIG. 2. In case x is over 0.7 at the end of discharging, the discharge capacity is too small to be practical.

Figure 14:
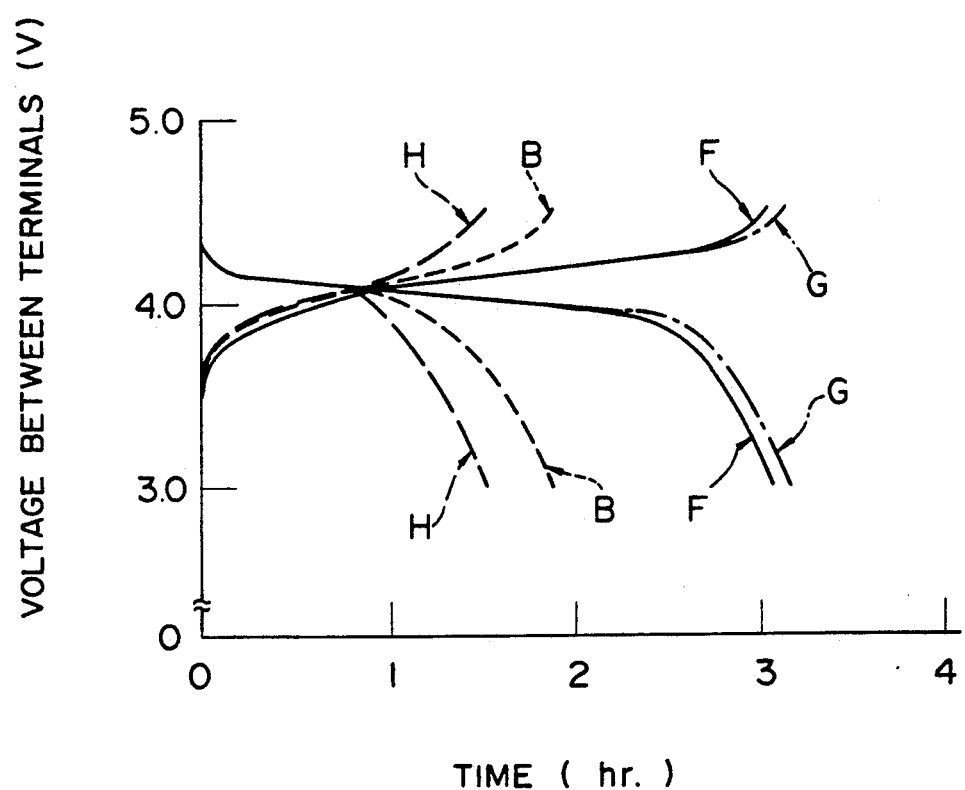
FIG. 14 shows the charge and discharge curves of an embodiment of the cells in accordance with the present invention, cell F using $Li_{0.9}Fe_{0.2}Mn_{1.8}O_4$, those of another embodiment of the present invention, cell G using $Li_{0.9}Cr_{0.2}Mn_{1.8}O_4$, those of one of Comparative Examples, cell H using $Li_{0.9}Mn_2O_4$ containing no Fe nor Cr, with less Li, and those of conventional cell B using $LiMn_2O_4$ at the 50th cycle, for comparison purpose.

FIG. 14 shows charge-discharge curves for embodiments of the present invention, i.e., cell F using $Li_{0.9}Fe_{0.2}Mn_{1.8}O_4$, and cell G using $Li_{0.9}Cr_{0.2}Mn_{1.8}O_4$, and comparative example cell H using $Li_{0.9}Mn_2O_4$ containing less Li, no Fe nor Cr, and conventional cell B using $LiMn_2O_4$ at the 50th cycle. In view of the charge curves corresponding to the dischargings, a charging voltage not less than 4 volts is required as can be seen. Moreover, the cells of the present invention were higher in a quantity of electricity for either charging or discharging.

Figure 15:
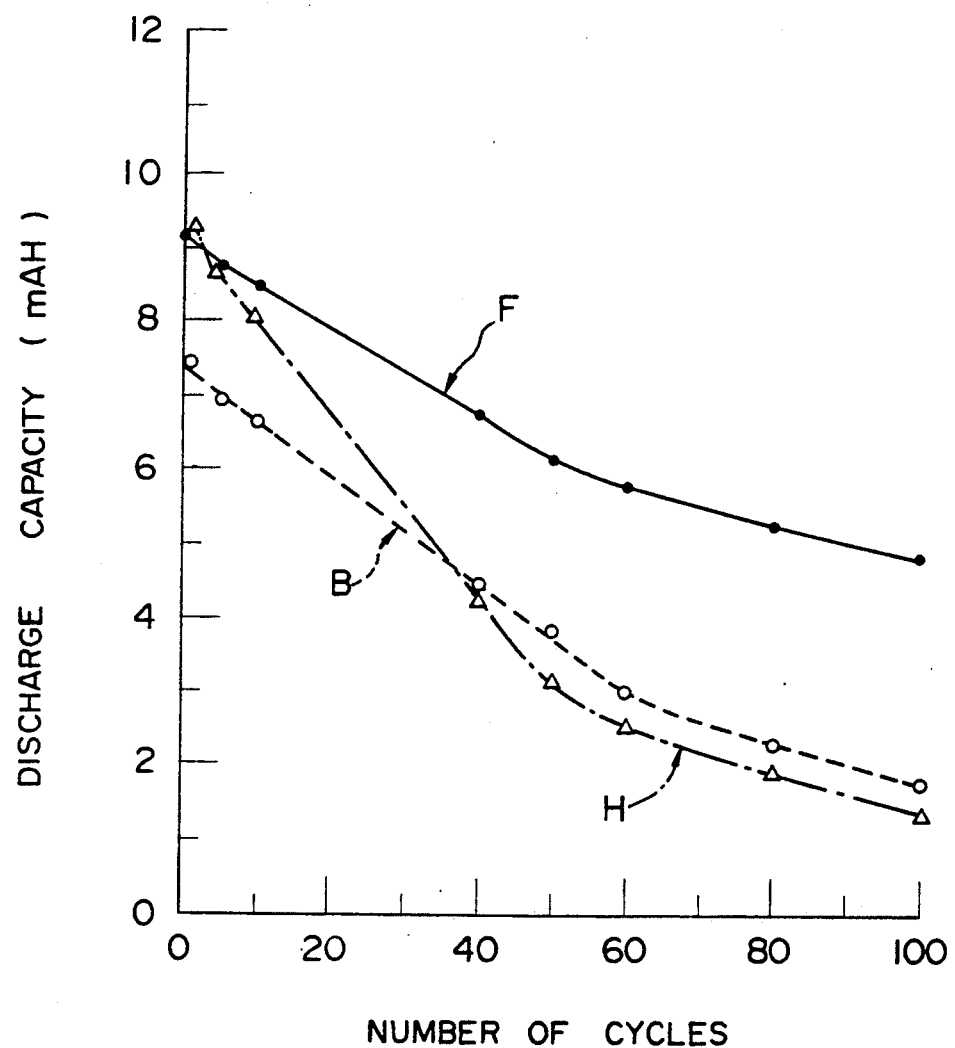
FIG. 15 is a plot of the discharge capacity of the cells as a function of the number of cycles.

FIG. 15 is a plot of the discharge capacity of these cells, Fe, H, and B at each cycle. It can be see from this Figure that the use of the active materials of the present invention results in good cycle life.

Chemical analysis has shown that at the end of charging at the 101th cycle, x was 0.84 for the conventional B, while 0.58 for A of the present invention. It has been found that the deterioration with cycles could be caused by destruction of the crystallinity of the active materials making charging impossible, that is, by a less tendency to the extraction of Li ions from the active materials.

Figure 16:
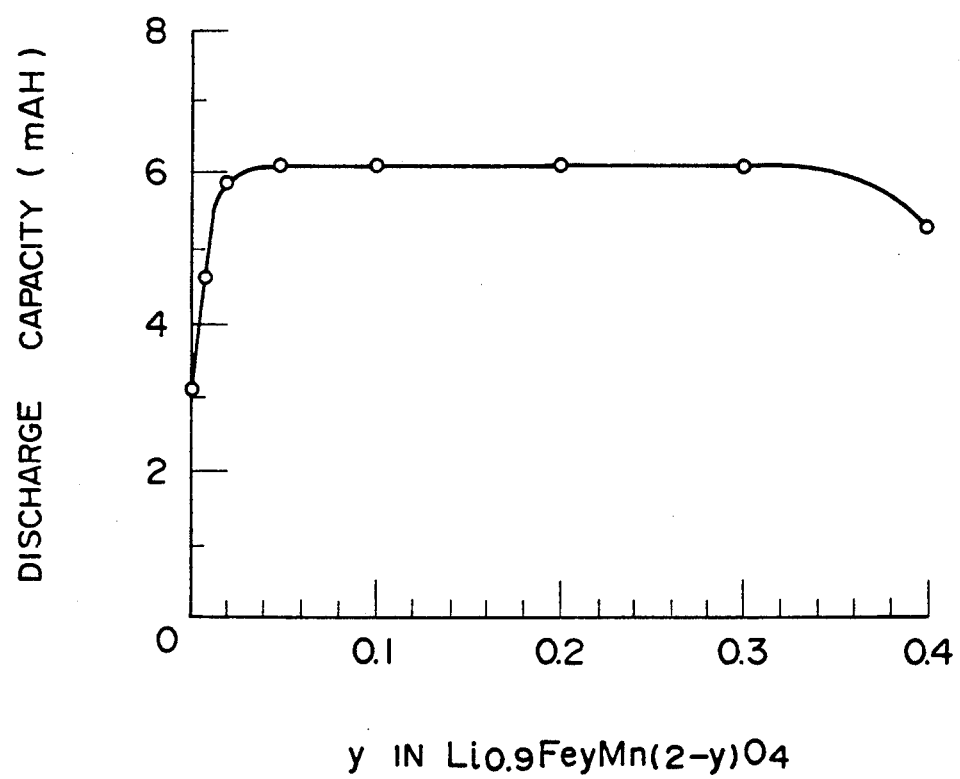
FIG. 16 shows the discharge capacity in terms of mAH as a function of y of $Li_{0.9}Fe_yMn_{(2-y)}O_4$ at the 50th cycle.

FIG. 16 shows the discharge capacity in terms of mAH of the cell using the $Li_{0.9}Fe_yMn_{(2-y)}O_4$ at the 50th cycle as a function of y. It can be seen that the cells in accordance with the present invention is superior to the conventional cell corresponding to y=0.

The cycling characteristics of the positive electrode active materials were represented by an index which is a product obtained by subtracting the discharge capacity at the 50th cycle from that at the tenth cycle, and dividing the difference by the latter discharge capacity. That is, the index means a rate of deterioration with cycles, the value of which should be lower for higher performance.

Figure 17:
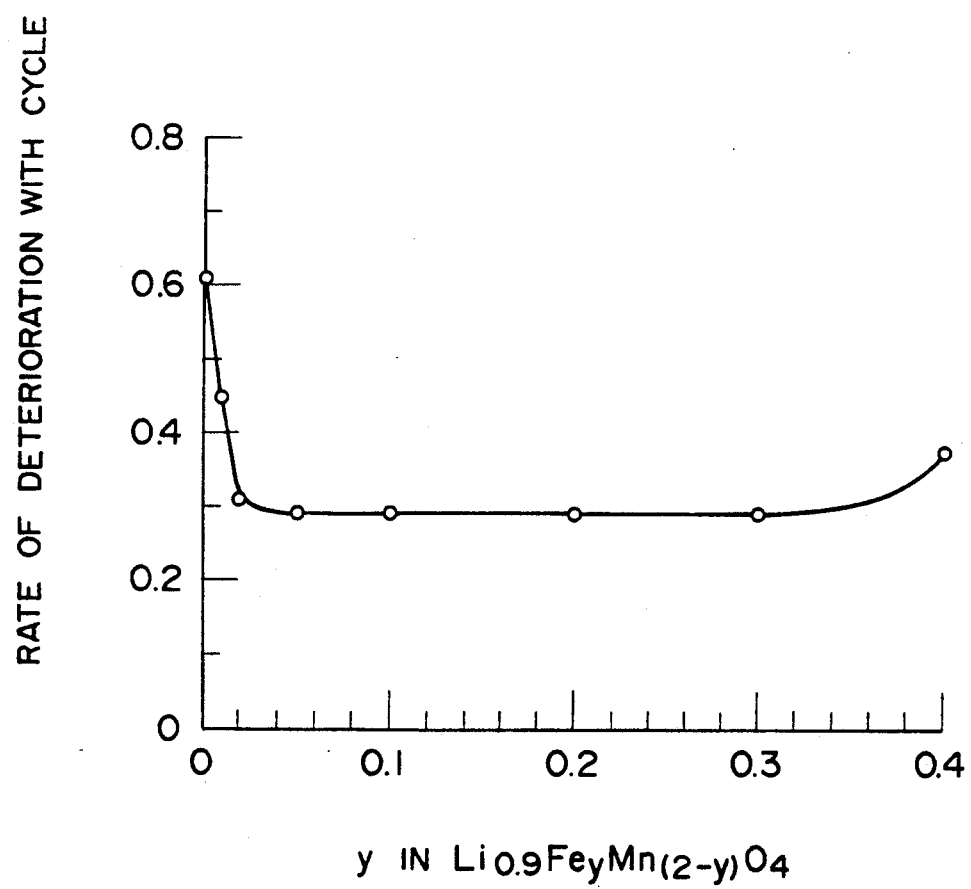
FIG. 17 shows the rate of deterioration with cycle of one of the active materials of the present invention $Li_{0.9}Fe_yMn_{(2-y)}O_4$, as a function of y.

FIG. 17 shows the rate of deterioration with cycle of each active material. It can be recognized that the cells of the present invention is superior to the conventional one corresponding to y=0.

Figure 18:
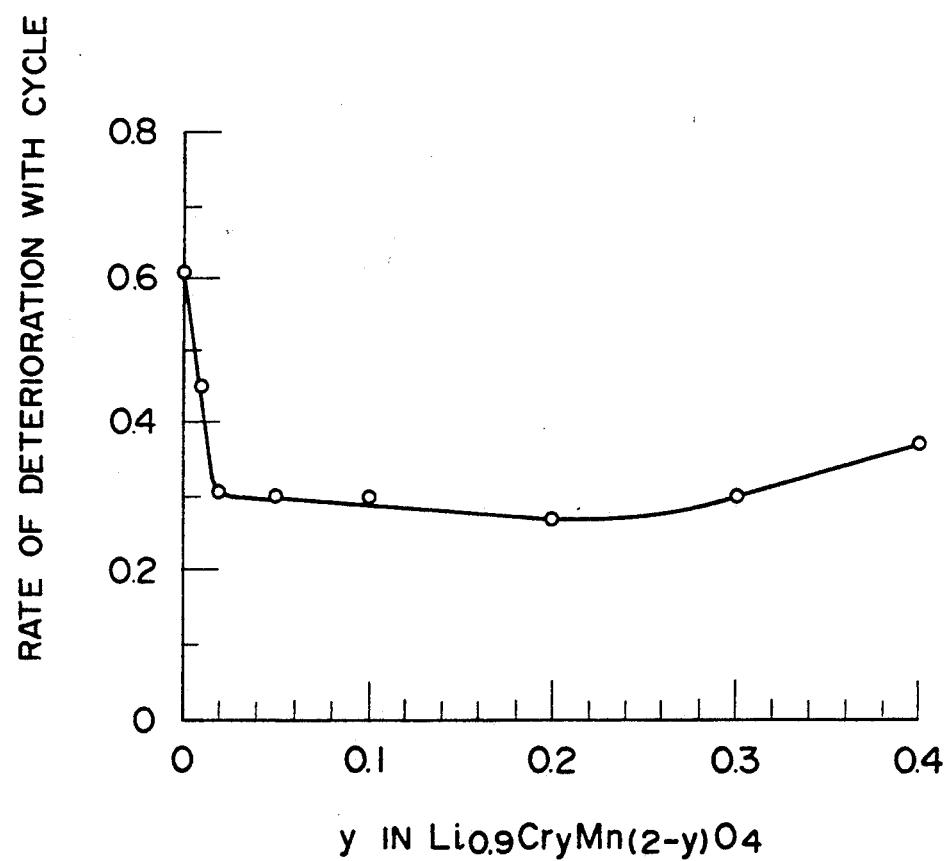
FIG. 18 shows the rate of deterioration with cycle of one of the active materials of the present invention $Li_{0.9}Cr_yMn_{(2-y)}O_4$, as a function of y.

Similarly, the rate of deterioration with cycles when using the active material, $Li_{0.9}Cr_yMn_{(2-y)}O_4$ as a function of y is shown in FIG. 18.

X-ray diffraction analysis has shown that the $Li_{0.9}Fe_yMn_{(2-y)}O_4$ and the $Li_{0.9}Cr_yMn_{(2-y)}O_4$ in accordance with the present invention has almost the same diffraction pattern as that of $LiMn_2O_4$. However, the locations of peaks in the patterns are shifted to a higher angle as compared with those of $LiMn_2O_4$, and the lattice constants obtained from the diffraction peaks were smaller than that of $LiMn_2O_4$. It is believed that the contract of the lattice constant stabilizes the crystal causing enhancement of the cycle life.

It can be recognized from the above that the rate of deterioration with cycles becomes smaller when y is 0.02 or more. When y is in excess of 0.3, the rate of deterioration increases with cycles. This is believed due to occurrence of strain in the crystal. This caused a reduction in discharge capacity as shown in FIG. 16. Therefore, the value of y should preferably be 0.02 or more but 0.3 or less. Then, the positive electrode active materials of $Li_xFe_yMn_{(2-y)}O_4$ with x and y being varied were synthesized, and cells were manufactured and tested for charging and discharging properties in the same way as described previously. Table 5 shows the discharge capacity of the $Li_xFe_yMn_{(2-y)}O_4$ at the 50th cycle in terms of mAH as a function of x and y. Table 6 shows the rate of deterioration with cycle of each active material.

TABLE 5

| | | Proportion of Li, x | | | | |
|---|---|---|---|---|---|---|
| | | 1.0 | 0.95 | 0.90 | 0.85 | 0.80 |
| Proportion of Fe, y | 0 | 3.8 | 3.4 | 3.1 | 3.0 | 2.6 |
| | 0.01 | 4.8 | 4.3 | 4.6 | 4.8 | 3.6 |
| | 0.02 | 5.2 | 5.5 | 5.9 | 5.7 | 4.1 |
| | 0.05 | 5.5 | 5.8 | 6.1 | 6.0 | 4.4 |
| | 0.1 | 5.8 | 6.1 | 6.1 | 6.0 | 4.5 |
| | 0.2 | 6.0 | 6.2 | 6.1 | 6.0 | 4.5 |
| | 0.3 | 5.2 | 5.6 | 6.0 | 5.5 | 4.4 |
| | 0.4 | 4.0 | 5.0 | 5.2 | 3.8 | 3.0 |

TABLE 6

| | | Proportion of Li, x | | | | |
|---|---|---|---|---|---|---|
| | | 1.0 | 0.95 | 0.90 | 0.85 | 0.80 |
| Proportion of Fe, y | 0 | 0.44 | 0.55 | 0.61 | 0.64 | 0.70 |
| | 0.01 | 0.34 | 0.45 | 0.45 | 0.46 | 0.60 |
| | 0.02 | 0.29 | 0.31 | 0.31 | 0.36 | 0.54 |
| | 0.05 | 0.25 | 0.29 | 0.29 | 0.33 | 0.51 |
| | 0.1 | 0.20 | 0.29 | 0.29 | 0.33 | 0.50 |
| | 0.2 | 0.17 | 0.29 | 0.29 | 0.33 | 0.50 |
| | 0.3 | 0.23 | 0.30 | 0.30 | 0.38 | 0.50 |
| | 0.4 | 0.35 | 0.36 | 0.37 | 0.55 | 0.65 |

As can be seen from the above, the cycle life can be enhanced when y from the $Li_xFe_yMn_{(2-y)}O_4$ is 0.02 or more but 0.3 or less, and in addition, the discharge capacity is higher when x is 0.85 or more but less than 1 as compared with the conventional $LiMn_2O_4$ and the comparative example $Li_xMn_2O_4$.

Moreover, $Li_xCr_yMn_{(2-y)}O_4$ was studied.

As a result, a similar tendency to that in the case of the $Li_xFe_yMn_{(2-y)}O_4$ was attained. That is, the cycle life can be enhanced when y from the $Li_xCr_yMn_{(2-y)}O_4$ is 0.02 or more but 0.3 or less, and in addition, the discharge capacity is higher when x is 0.85 or more but less than 1 as compared with those in the cases of the conventional $LiMn_2O_4$ and the comparative example $Li_xMn_2O_4$. The reason that even when Fe is contained, the discharge capacity becomes higher with x being below 1 as compared with that at x=1 as shown in Table 5 is believed due to the fact that the discharge capacity at the first cycle is increased with x being not higher than 1, and further the cycle life are enhanced by inclusion of Fe as shown in FIG. 6.

The present invention has been illustrated with reference to the results when charging was effected up to 4.5 volts with x being reduced to 0.7 or less, and discharging until x reaches 1. However, the present invention should not be limited to the case of x being 1, but it is effective to the case where charging is carried out until x becomes 0.7 or less and discharging until x becomes 1 or more to 1.8.

In Example 8, there can be provided non-aqueous electrolyte secondary cells having a negative electrode of lithium or a lithium compound, non-aqueous electrolyte containing a lithium salt, and having a good cycle life by using a positive electrode active material represented by the general formula, $Li_xM_yMn_{(2-y)}O_4$, wherein M is at least one selected from the group consisting of Cr, Fe and the like, $0.85 \leq x < 1$, and $0.02 \leq y \leq 0.3$.

Summarizing Examples 6 to 8, there can be provided non-aqueous electrolyte secondary cells having a negative electrode of lithium or a lithium compound, non-aqueous electrolyte containing a lithium salt, and having a good cycle life by using a positive electrode active material represented by the general formula, $Li_x M_y Mn_{(2-y)} O_4$, wherein M is at least one selected from the group consisting of Cr, Fe and the like, $0.85 \leq x < 1.5$, and $0.02 \leq y \leq 0.3$.

Moreover, summarizing Examples 1 to 8, there can be provided non-aqueous electrolyte secondary cells having a negative electrode of lithium or a lithium compound, non-aqueous electrolyte containing a lithium salt, and having a good cycle life by using a positive electrode active material represented by the general formula, $Li_xM_yMn_{(2-y)}O_4$, wherein M is at least one selected from the group consisting of Cr, Fe and the like, $0.85 \leq x < 1.5$, and $0.02 \leq y < 0.3$.

Examples where discharging was stopped at 3 volts have been described. Alternatively, with the active materials of the present invention, discharging may be conducted to a large extent to 2 volts, that is, discharging not only at the first step, but also at the second step may be conducted as shown in FIG. 2 without affecting the good cycle life.

EXAMPLE 9

Using the similar active materials to those as described in Examples 1 to 8, cells were manufactured similarly.

Charging and discharging test of cells

These cells were charged to 4.5 volts at a constant electric current of 2 mA and discharged to 2 volts, which charging and discharging cycle was repeated.

Under the above conditions, at the first cycle, the cells were charged until a proportion of Li, x in the positive electrode active material reached below 0.7, i.e., in the order of 0.3, and discharged until the x reached 1.8, as can be seen from FIG. 2.

The active materials of the present invention as described in Examples 1 to 8 exhibited good cycling characteristics even when discharging to 2 volts.

Figure 19:
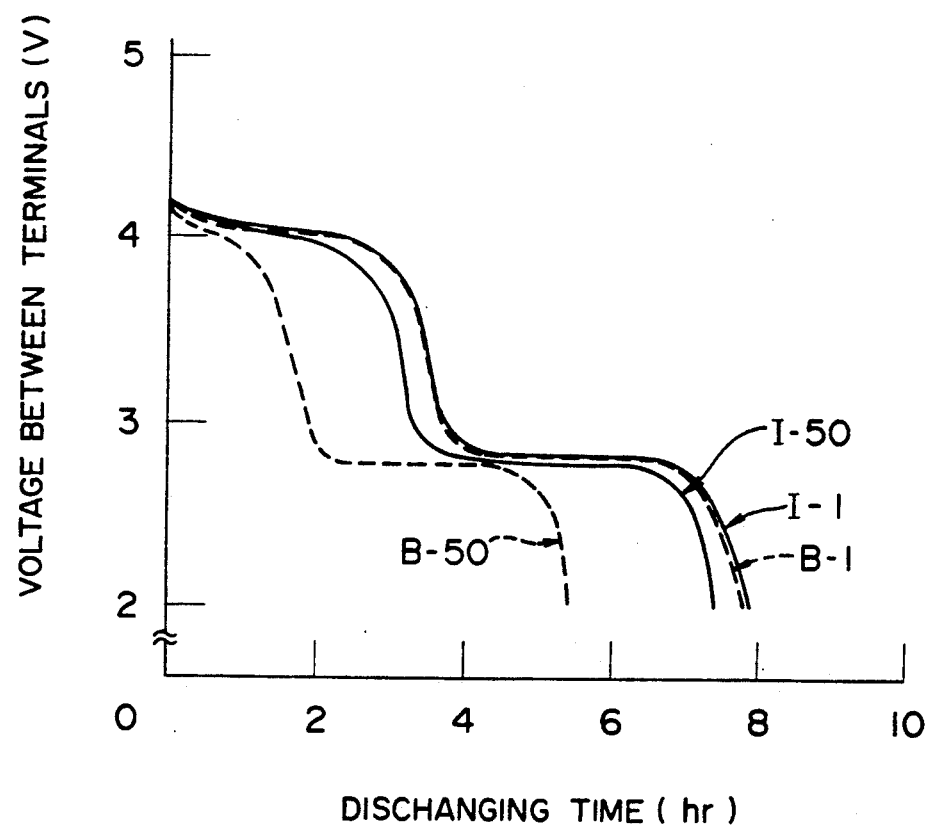
FIG. 19 shows the charge and discharge curves of cell I in accordance with the present invention, and those of a conventional cell B, at the first cycle (I-1, B-1), and at the 50th cycle (I-50, B-50).

FIG. 19 shows the discharge curve at the first cycle of cell I using $LiCo_{0.2}Mn_{1.8}O_4$, an embodiment of the present invention (I-1), the discharge curve at the 50th cycle thereof (I-50), and the discharge curve at the first cycle of conventional cell B using $LiMn_2O_4$, (B-1), the discharge curve at the 50th cycle thereof (B-50). The cells of the present invention exhibited less deterioration with cycles. Comparing the discharge curve at the first cycle of cell B with that at the 50th cycle thereof, a discharging time at the second step from 3 volts or less but 2 volts or more was somewhat shortened indicating occurrence of some deterioration. However, a discharging time at the first step from 4.5 volts or less but 3 volts or more was considerably shortened indicating occurrence of a great deterioration. It can be found that cell I according to the present invention was subjected to little deterioration at the second step, and also a less deterioration at the first step.

This result indicated that the deterioration with cycles occurs significantly in the region of the first step. Therefore, it can be understood that the active materials of the present invention as described in Examples 1 to 8 exhibited good cycling characteristics even when discharging to 2 volts because of less deterioration at the first step.

EXAMPLE 10

Using the same active materials as those of Examples 1 to 8, cells were manufactured similarly, except that the electrolyte was changed. An electrolyte was prepared using the combination of a solute and a solvent from solutes of lithium salts such as $LiClO_4$, $LiSF_6$, $LiPF_6$, and $LiBF_4$ and solvents such as propylenecarbonate and a mixed solvent of propylenecarbonate and ethylenecarbonate in a volume ratio of 1:1.

Test of cells was the same as that in Example 1. The results were almost identical with those in Examples 1 to 8. The active materials of the present invention exhibited good cycling characteristics.

The fact indicates that the active materials of the present invention exhibits good characteristics independently of the type of a non-aqueous electrolyte containing a lithium salt.

Using the same active materials as those in Examples 1 to 8, cells were manufactured similarly, except that the negative electrode was changed. An electrode of an Li-Al alloy or $WO_2$ intercalated with Li was used. Test of cells was the same as that in Examples 1 and 9. The results were almost identical with those in Examples 1 and 9. The active materials of the present invention exhibited good cycling characteristics.

EXAMPLE 11

Figure 20:
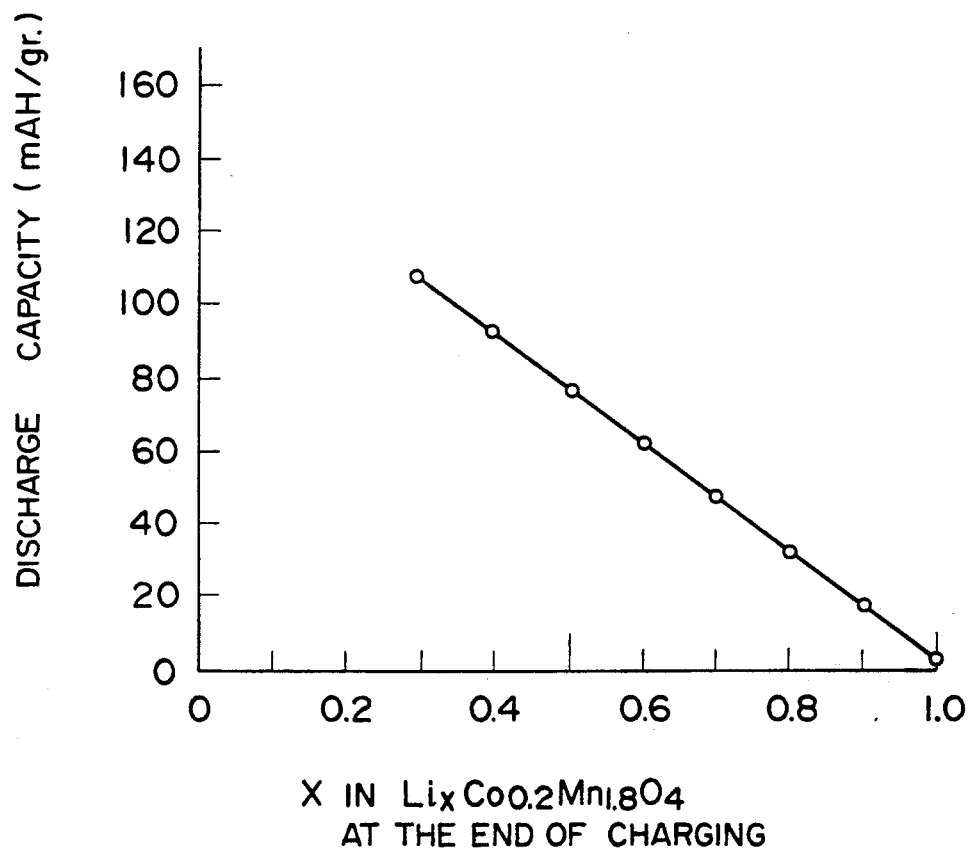
FIG. 20 shows a relationship between the discharge capacity and the composition of active material, $Li_xCo_{0.2}Mn_{1.8}O_4$, as a function of x, at the end of charging.

Using the same active materials as those in Examples 1 to 8, cells were manufactured similarly. Charging and discharging were conducted under the same conditions as those in Example 1, except that the quantity of electricity was changed. Variation of the charging quantity of electricity varies a value of x from the $Li_xMn_{(2-y)}O_4$ at the end of charging. Relationship between the quantity of electricity charged and the quantity of electricity discharged was studied by converting to the value of x at the end of charging and a quantity of electricity discharged. FIG. 20 is a plot of the relation between the quantity of electricity charged and the quantity of electricity discharged at the first cycle of the cell using $LiCo_{0.2}Mn_{1.8}O_4$, an embodiment of the present invention in accordance with the aforementioned convertion. Thus, a sufficient discharge capacity could be obtained when the composition of the positive electrode active material in a charged state has x of 0.7 or less. This result that a sufficient discharge capacity could be obtained when the composition of the positive electrode active material in a charged state has x of 0.7 or less was identical with those in other cases including conventional examples.

Summarizing the results described in Examples 1 to 11, a non-aqueous electrolyte secondary cell having a negative electrode of lithium or a lithium compound, and a non-aqueous electrolyte containing a lithium salt may be improved by using a positive electrode active material represented by the general formula, $Li_xM_yMn_{(2-y)}O_4$ wherein M is at least one selected from the group consisting of Co, Cr, Fe and the like, $0.85 \leq x < 1.15$, and $0.02 \leq y \leq 0.3$, and by allowing the composition of the active material in a charged state to have the general formula, $Li_xM_yMn_{(2-y)}O_4$, wherein $x \leq 0.7$, owing to the extraction of lithium ions on charging so that it has enhanced cycling characteristics and a sufficient discharge capacity even after some cyclic operations. Therefore, the present invention makes a significant contribution to industry.

What is claimed is:

1. A non-aqueous electrolyte secondary cell comprising a negative electrode composed of at least one selected from the group consisting of lithium and lithium compounds, a non-aqueous electrolyte containing a lithium salt, and a positive electrode active material having a composition represented by the formula, $Li_xM_yMn_{(2-y)}O_4$, wherein M is at least one selected from the group consisting of Co, Cr and Fe, $x \leq 0.7$ and $0.02 \leq y \leq 0.3$ under charging, said positive electrode active material in a charged state having the composition represented by the general formula, $Li_xM_yMn_{(2-y)}O_4$, wherein $x = 0.7$, owing to the extraction of lithium ions from said positive electrode active material on charging.

2. A non-aqueous electrolyte secondary cell comprising a negative electrode composed of at least one selected from the group consisting of lithium and lithium compounds, a non-aqueous electrolyte containing a lithium salt, and a positive electrode active material having a composition represented by the formula, $Li_xM_yMn_{(2-y)}O_4$ wherein M is Co, $x \leq 0.7$, and $0.02 \leq y < 0.3$ under charging, said positive electrode active material in a charged state having the composition represented by the general formula, $Li_xM_yMn_{(2-y)}O_4$, wherein $x \leq 0.7$, owing to the extraction of lithium ions from said positive electrode active material on charging.

3. A non-aqueous electrolyte secondary cell comprising a negative electrode composed of at least one selected from the group consisting of lithium and lithium compounds, a non-aqueous electrolyte containing a lithium salt, and a positive electrode active material having a composition represented by the formula, $Li_xM_yMn_{(2-y)}O_4$, wherein M is at least one element selected from the group consisting of Cr and Fe, $x \leq 0.7$, and $0.02 \leq y \leq 0.3$ under charging, said positive electrode active material in the charged state having a composition represented by the formula, $Li_xM_yMn_{(2-y)}O_4$, owing to the extraction of lithium ions from said positive electrode active material on charging.

* * * * *